United States Patent [19]

Brosnan

[11] Patent Number: 4,689,794
[45] Date of Patent: Aug. 25, 1987

[54] INJECTION LOCKING A XENON CHLORIDE LASER AT 308.4 NM

[75] Inventor: Stephen J. Brosnan, San Pedro, Calif.

[73] Assignee: Northrop Corporation, Hawthorne, Calif.

[21] Appl. No.: 695,658

[22] Filed: Jan. 28, 1985

[51] Int. Cl.$^4$ .............................................. H01S 3/098
[52] U.S. Cl. ...................................... 372/18; 372/57; 372/20; 372/60
[58] Field of Search ........................ 372/20, 18, 57, 59, 372/60

[56] References Cited

U.S. PATENT DOCUMENTS 4,301,425  11/1981  Sze ........................................ 378/60

OTHER PUBLICATIONS

Reksten et al; "Active Mode Locking of a XeCl Laser"; Appl. Phys. Lett. 39(2), Jul. 15, '81.
Levatter et al; "Long Pulse Behavior of the Avalanche/Self-Sustained Discharge Pumped XeCl Laser"; Appl. Phys. Lett. 39(4) Aug. 15, '81.
Sze; "Improved Lasing Performance of XeCl Using Ar and Ne Diluents"; J. Appl. Phys 50(7), Jul. 79.
Watanabe et al; "Spatially Resolved Gain Measur. in UV Preionized Homo. Disch. XeCl and KrF Lasers"; Appl. Phys. Lett. 38(1), Jan. 1, 1981.

Primary Examiner—Leon Scott, Jr.
Attorney, Agent, or Firm—Terry J. Anderson; Robert B. Block

[57] ABSTRACT

A method for injection locking a xenon chloride laser at 308.4 nm. Neon (Ne) is used as a diluent in the laser to shift slightly the gain profile of the laser towards the longer wavelengths and towards 308.4 nm. The laser is operated at a lower level of gain than is used in the prior art by using a lower level of electrical discharge than was used in the prior art. The lowered gain reduces the numerical magnitude of the difference in the gain of the laser at 308.4 nm and its gain at the highest gain modes of operation. Either a low level signal at 308.4 nm is injected into the laser to mode lock the lowered gain laser at 308.4 nm. or a frequency selection device such as etalons is inserted within the laser cavity to restrict operation to 308.4 nm. The period of the electrical discharge also is lengthened from that typically used in the prior art so as to obtain saturation of the output at 308.4 nm.

5 Claims, 2 Drawing Figures

INJECTION LOCKING A XENON CHLORIDE LASER AT 308.4 NM

BACKGROUND OF THE INVENTION

This invention pertains to methods and devices for concentrating within a single mode most of the laser energy emitted from a gas laser. More particularly, this invention pertains to a method for concentrating most of the laser emission from a xenon chloride excimer laser in the mode having a wave length of 308.4 nm.

DESCRIPTION OF THE PRIOR ART

Injection locking has been used to concentrate the laser energy emitted from a gas laser at or near one of the natural modes of operation of the laser. A low level signal at the desired wavelength is injected into the gas laser at the same time as the gas is "pumped" by an electrical discharge of current through the gas. If the wavelength of the low level signal coincides with the laser mode which exhibits the highest gain in the device, the low level signal may be used successfully to "injection lock" or concentrate the energy in the one, high gain mode emitted by the laser (at and near the desired wavelength). Injection locking of lasers has been described by West, Komine, and Stappaerts in "Efficient Injection-Locking of an e-Beam Excited XeF Laser", *Journal of Applied Physics*, 52(8), August 1981, pp. 5383–5385, and by Goldhar, Rapoport, and Murray, in "An Injection-Locked Unstable Resonator Rare-Gar Halide Discharge Laser of Narrow Line Width and High Spatial Quality", *IEEE Journal of Quantum Electronics*, Vol. QE-16, No. 2, February 1980, pp. 235–241, and many others.

Injection locking has also been used to concentrate the energy emitted from a xenon chloride excimer laser at wavelengths of 308.2 and 307.95 nm, which are the wavelengths of the two modes which exhibit the highest gain for such a laser. See O. L. Bourne and A. J. Alcock, in a pre-conference description of their presentation titled "Probing a XeCl Gain Module with a 0.0004A Bandwidth ($\Delta\nu$- 100 MHz) Probe Pulse", Thirty-Fifth Gaseous Electronics Conference, Oct. 19-22, 1982, Dallas, Tex. Bourne and Alcock reported using neon as a diluent and indicated that they had obtained injection locking, i.e., concentration of a significant portion of the emitted energy in one mode, for each of the two highest gain modes of the laser, i.e., at 307.93 mn and 308.19 nm. Prior to the instant invention, however, efforts to injection lock a xenon chloride laser at 308.4 nm had been unsuccessful.

SUMMARY OF THE INVENTION

The present invention uses neon as a diluent in a xenon chloride excimer laser to shift the gain profile of the laser to a slightly lower frequency. An electrical discharge, which is longer in duration and lower in intensity than normally used in the prior art to pump a laser, is used in this invention to enable operation of the laser at a lower gain of about one-half to one-third of the gain that was used by other experimenters attempting to mode lock such a laser at 308.4 nm. Lowering the intensity of the discharge causes an "across the board", proportional, decrease in the gains of the laser at the wavelengths of its various modes of operation. As a consequence, the numerical magnitude of the differences in the gain of the laser at 308.4 nm and the gains at the highest gain modes at 308.2 and 307.95 nm are reduced in the same proportion, that is to about one-half to one-third of the values that existed in the laser used by other experimenters. The effects of using neon as a diluent, reducing the gain to one-half to one-third of the values used in the prior art, and extending the period of the electrical discharge, combine to concentrate approximately 90% of the emitted laser energy at or near the 308.4 nm line.

DESCRIPTION OF THE PREFERRED EMBODIMENT

Figure 1:
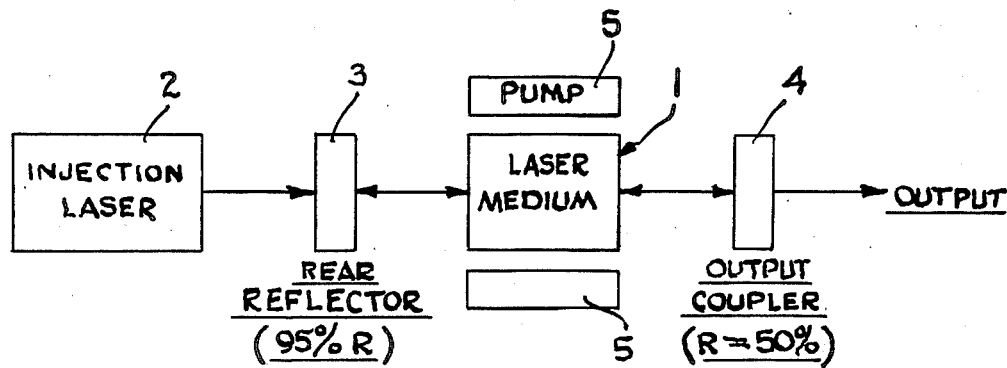
FIG. 1 is a block diagram showing injection locking of the laser.

The major elements of the XeCl excimer gas laser are depicted in FIG. 1. The laser medium 1 uses neon at 4 atmospheres of pressure as the diluent and contains 0.3% xenon and 0.03% HCl. The lasing medium extends over a length of approximately 90 cm. By using neon, rather than helium, as the diluent, it has been found that the gain profile of the laser is shifted to slightly lower frequencies.

Laser energy at 308.4 nm is emitted from injection laser 2 and impinges on rear reflector 3 of the laser cavity into which the energy is to be injected. Rear reflector 3 has a high reflectivity of approximately 95% and, as a consequence, most of the energy incident from injector laser 2 is reflected, but a small portion, approximately 5%, passes through rear reflector 3 into laser medium 1 where the injected energy precipitates the buildup of lasing action at 308.4 nm. Injection laser 2 may be simply another XeCl excimer laser of lower power which has been tuned by means of etalons, frequency dispersive prisms, or gratings so as to operate at 308.4 nm. Injection laser 2 also may instead be a dye laser whose output has been frequency doubled to 308.4 nm.

Referring again to FIG. 1, output coupler 4 is the second mirror of the two which form the laser cavity and has a reflectivity of approximately 50%. The laser medium 1 is pumped by pump 5 which pump consists of conducting electrodes, energy sources, and switching and control devices for discharging electrical current through laser medium 1.

In contrast to the XeCl gas lasers of the prior art, in which the gain for one pass through the laser medium was of the order of $e^{10}$ to $e^{11}$, the gain of the laser medium in this invention is reduced to the range of $e^3$ to $e^6$ for one pass through the laser medium 1 (where $e = 2.71828\ldots$, the base of natural logarithms). A gain of approximately of $e^5$ has been found to give the best results. Also in contrast to XeCl excimer gas lasers of the prior art for which the laser medium was pumped for a period typically of twenty or so nanoseconds, the period during which the laser medium is pumped in the present invention is approximately 80 to 100 ns.

The reduction in the gain of the laser medium to a value of approximately one-third to one-half of that used in the prior art also reduces by the same factor the absolute difference between the gains of the laser at the different wavelengths of its modes of operation. By reducing the differences between the gains of the different modes, the lasing action at the desired wavelength of 308.4 nm, that is at the wavelength of the injected energy, is allowed to build up towards saturation before any significant buildup in lasing action occurs at 307.95 and 308.2 nm.

By extending the period of time over which the laser medium is pumped, the lasing action at 308.4 nm also is given sufficient time, at the reduced obsolete level of gain, to increase to the saturation level. The length of the pump period, however, is limited to less than 100 to 150 nanoseconds so that the lasing action at the shorter wavelengths does not have sufficient time to become significant in size.

For an injection signal of approximately 1.0% of the intensity of the saturated energy density in the laser medium at 308.4 nm, and an injection bandwidth of approximately 0.01 nm, 93% of the energy emitted from the laser medium has been produced at 308.4 nm in the preferred embodiment.

The gain of the laser medium is reduced from that used in the prior art by using a lower discharge voltage than that normally used in the prior art. Typically, in the prior art, a capacitor or a transmission line was charged to a sufficiently high voltage such that the high voltage would initiate breakdown of the gas in the laser. Energy at this high voltage then would be discharged through the laser medium to pump the laser medium. For a specific gas, the gain of the laser medium tends to be determined primarily by the magnitude of the discharge voltage. As a consequence, the prior art devices operated a levels of gain determined by the high break down voltage. However, as described in co-pending patent application Ser. No. 575,463 titled "Electric Glow Discharge Using Prepulse and Charge Storage Device" a method is available for applying a "prepulse" to the laser medium at a sufficiently high voltage to cause breakdown in the gas which prepulse is then followed by the application of a significantly lower voltage for the period over which the discharge is to be sustained. The sustaining voltage typically is of the order of one-third to one-half of the voltage required in the prepulse to cause breakdown in the gas to initiate the discharge. This lower "sustaining" voltage is used in the present invention to operate the laser at the desired lower level of gain.

Also by using pre-ionization by means of X-rays or other radiation sources in combination with the prepulse, the sustained discharge may be applied for much longer periods than the 20 to 40ns used in the prior art, without incurring significant arcing within the gaseous medium. By such means the pump period is extended to the 100 ns or so required by the present invention.

Figure 2:
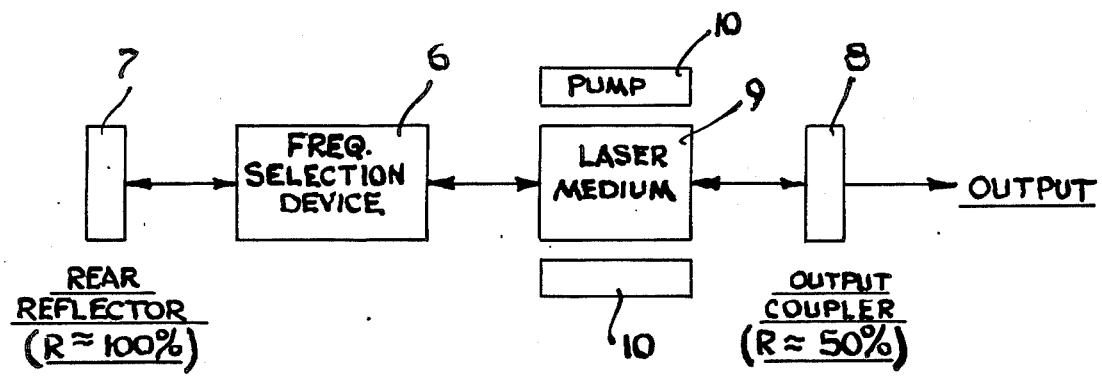
FIG. 2 is a block diagram showing the use of a frequency selective device to tune the laser.

FIG. 2 depicts a second embodiment of the invention in which a frequency selection device 6 is incorporated within the laser resonator cavity formed by rear reflector 7 and output coupler 8. As indicated in the figure, the rear reflector has a reflectivity of nearly 100% and the output coupler has a reflectivity of approximately 50%. The laser medium 9 and the pump 10 in the second embodiment are similar to the same elements in the first embodiment depicted in FIG. 1. Frequency selection device 6 may be any of a number of devices available for selecting the frequency at which the laser operates. For instance, the device may be one or more dispersive prisms, diffraction gratings, or etalons The net effect of the frequency selection device is to reduce the gain of the laser at wavelengths other than the desired wavelength of 308.4 nm so that the laser emits energy primarily at 308.4 nm. The gain of the laser medium in the second embodiment and the period of time over which the discharge is sustained is the same as that for the first embodiment illustrated in FIG. 1, and results similar to that for the first embodiment may be obtained. Again, the laser medium in the preferred embodiment is approximately 90-100 cm in length, and is composed of the same gases as are used in the first embodiment.

I claim:

1. A method for concentrating the laser energy emitted from a xenon chloride excimer gas laser at the 308.4 nm wavelength, which laser uses neon (Ne) as a diluent, and is pumped by a pulsed electrical discharge to exhibit a gain at 308.4 nm, comprising:

injecting, at or near the beginnning of each pulse of the electrical discharge, a low level signal into the laser at a wavelength of approximately 308.4 nm, adjusting the length of the pulsed electrical discharge to be in the range of from 50 to 150 nanoseconds, and adjusting the intensity of the electrical discharge so as to provide a gain for the laser at 308.4 nm of from $e^3$ to $e^6$ per pass through the lasing medium.

2. A method for concentrating the laser energy emitted from a xenon chloride excimer gas laser at the wavelength of 308.4 nm, said laser including a resonator cavity, which laser uses neon (Ne) as a diluent, and is pumped by a pulsed electrical discharge to exhibit a gain at 308.4 nm, comprising:

inserting into the resonator cavity of the laser, selection means for selecting the frequency at which laser action will occur, adjusting the length of the pulsed electrical discharge to be in the range of from 50 to 150 nanoseconds, and, adjusting the intensity of the electrical discharge so as to provide a gain for the laser at 308.4 nm of from $e^3$ to $e^6$ per pass through the laser.

3. The method described in claim 2 wherein the selection means comprises at least one etalon.

4. The method described in claim 2 wherein the selection means comprises at least one dispersive prism.

5. The method described in claim 2 wherein the selection means comprises at least one diffraction grating.

* * * * *